United States Patent Office 3,842,150
Patented Oct. 15, 1974

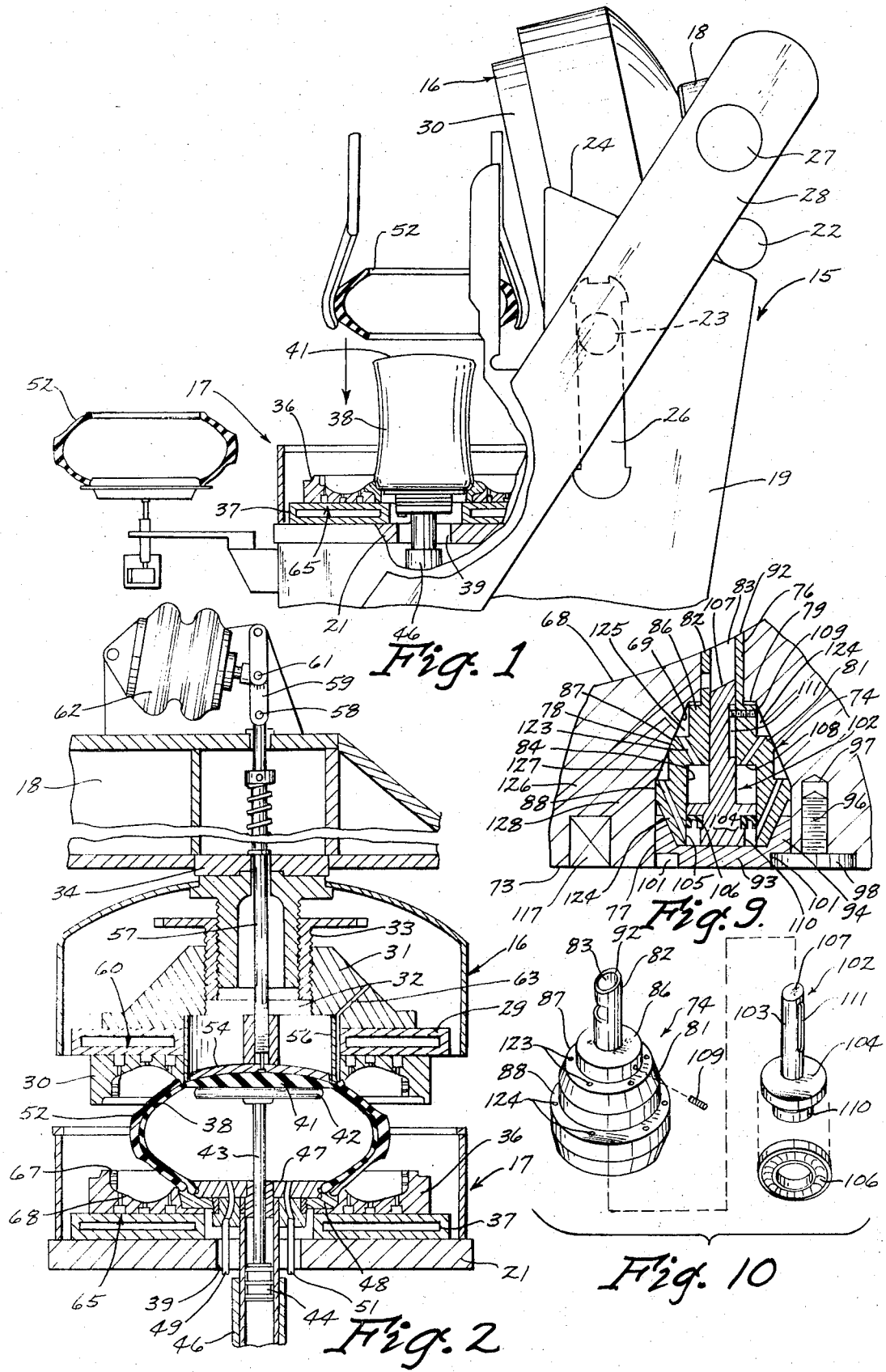

3,842,150
METHOD FOR FORMING A TIRE
Russell W. Carter, Des Moines, Iowa, assignor to Corn States Metal Fabricators, Inc., Des Moines, Iowa
Filed Jan. 12, 1973, Ser. No. 323,041
Int. Cl. B29h 5/02
U.S. Cl. 264—102
3 Claims

ABSTRACT OF THE DISCLOSURE

Separable mold sections of a tire forming machine are brought together to form a tire cavity within which an inflatable shaping mechanism or bladder is axially carried in the lower mold section. During a first or initial tire shaping operation air is exhausted from the cavity through valve controlled air passages, open to the cavity side wall, to produce a sub-atmospheric pressure in the cavity. Concurrently with the initiation of a second or final stage tire shaping operation the air passages are closed flush with the surface of the cavity side wall so that the tire is finally shaped under a sub-atmospheric pressure into conformance with a cavity side wall having a continuous smooth surface.

SUMMARY OF THE INVENTION

The tire forming method of this invention is readily applicable to present commercially available and existing tire forming machines which are then capable of efficiently and economically producing tires having smooth side walls and treads free of any radially protruding rubber pins. The final forming of the tire in a sub-atmospheric pressure substantially eliminates any wrinkles in the tire side wall, resulting from the forming of air pockets between the tire and the cavity side wall so that tire rejects or seconds are reduced to a minimum. By virtue of eliminating the usual pins and the providing of a smooth finish on the side wall, the formed tire may be used for show and display purposes without requiring any special attention or preparation.

Brief Description of the Drawings

FIG. 1 is a fragmentary side elevation, with parts broken away and other parts shown in section, illustrating the tire mold sections of a tire forming machine in open position to receive a tire band;

FIG. 2 is a sectional view of the tire forming machine showing the mold sections in partly closed position and the bladder partially expanded within the tire band;

FIG. 9 is an enlarged longitudinal sectional view of an air control valve; and

FIG. 10 is an exploded perspective view of an air control valve.

Detailed Description of the Invention

Figure 3:
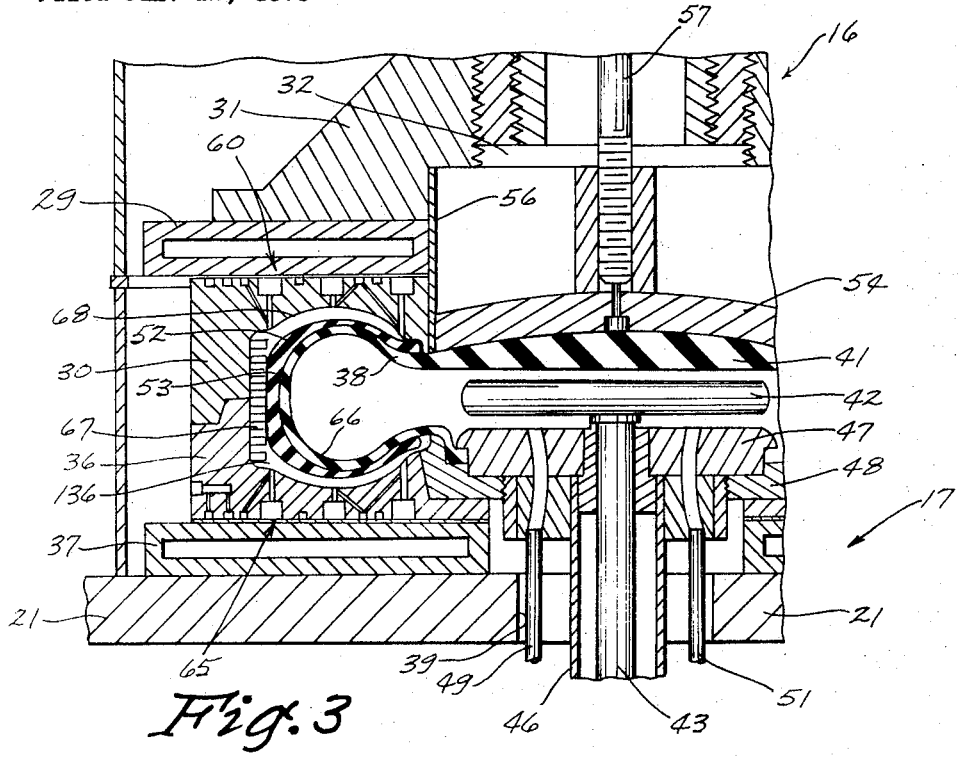
FIG. 3 is a sectional view showing in enlargement a portion of FIG. 2 with the mold section in closed position and the bladder expanded to a first stage wherein the tire band is adjacent to but spaced from the side wall of the tire cavity.

Referring to FIG. 1 of the drawing, there is illustrated a tire forming or curing machine, indicated generally as 15, and including upper and lower mold assemblies 16 and 17, respectively, wherein the upper mold assembly is movable toward and away from the lower mold assembly to relative closed and open positions, also respectively. The upper mold assembly is secured to the under side of a cross head 18 which extends across the machine and forms part of the operating mechanism for moving the upper mold assembly 16 relative to the lower mold assembly 17. Arranged at the opposite sides of the lower mold assembly are guide plates 19 which project upwardly from a base plate 21. A pair of rollers 22 and 23 for guiding the cross head 18 during movement of the upper mold assembly 16 are carried in guide ways 24 and 26, respectively. Each end of the cross head 18 has a bearing 27 mounted at the upper end of a corresponding link 28 that is positioned to the outside of an adjacent guide plate 24 or 26. The links 28 are actuated through a motor driven gear system (not shown) to raise and lower the cross head 18.

An upper mold member 30, which forms part of the upper mold assembly 16, is secured to the underside of an upper heating platen 29 that is attached to a head member 31 (FIG. 2). A threaded axial bore 32 in the head member 31 coacts with an externally threaded adjustable telescopic connector 33 to accommodate upper mold members or sections of varying sizes. The connector 33 is fastened to a supporting plate 34 attached to the underside of the cross head 18.

The lower mold assembly 17 (FIG. 2) includes a lower mold member 36 carried on the upper side of a lower heating platen 37 that is supported on the base plate 21. An operating mechanism for a tire shaping diaphragm or bladder 38, located axially of the lower mold member 36, extends through a central opening 39 formed in the base plate 21. The bladder 38 is radially distensible and in a normal non-distended condition is of a generally cylindrical shape, as shown in FIG. 1. The closed upper end or top wall 41 of the bladder has the lower or inner side thereof engageable by an actuating plate 42 which is carried at the free end of a piston rod 48, movable by a floating piston 44 that is reciprocally movable within a cylindrical tube 46 positioned axially of the central opening 39 in the base plate 21. The lower open side of the bladder 38 is closed by a flat plate 47 and a cooperating clamping ring 48. As shown in FIG. 2, the plate 47 slidably receives the piston rod 43 and is formed with passages for connection with fluid lines 49 and 51, hereinafter referred to as pressure and blow down lines, respectively.

On the admission of fluid under pressure into the cylinder 46, the actuating plate 42 engages and raises the closed upper end 41 of the bladder 38 to extend the bladder to its FIG. 1 axially extended position to a height determined by the engagement of the piston 44 with the underside of the plate member 47. With the bladder in an axially extended position and the upper mold assembly 16 in the open position therefor, a partially shaped and uncured tire band 52 (FIG. 1) is arranged concentrically about the bladder and within the lower mold section 17, either manually or by a suitable loading mechanism, indicated generally at 53.

On movement of the upper mold section 30 (FIG. 2) toward a mold closing position therefor, the bladder 38 is initially distended both radially and axially into a conforming relation with the inner surface of the tire band 52. This distention is accomplished by the introduction into the line 49 of what will hereinafter be referred to as a first stage pressure fluid, concurrently with the depressing or lowering of the bladder upper wall 41 by a downward pressure exerted thereon by a pressure piston 54, reciprocally movable in a retaining cylinder 56. A push rod 57 for the pressure piston 54 has its upper end pivotally connected at 58 to a toggle linkage 59 that has a center pivot 61 connected to a pneumatic actuating unit 62 of bellows type.

On extension of the bellows 62, a substantially uniform pressure is applied downwardly on the push rod 57 against the counteracting pressure applied by the floating piston 44 on the piston rod 43. A downward movement of the push rod 57 continues until the toggle linkage 59 reaches its overcenter position, shown in FIG. 2, corresponding to a position of the bladder top wall 41 at the lower end of the retaining cylinder 56. The relative positions of the bladder top wall 41 and retaining cylinder 56 are maintained on a continued movement of the upper mold member 30 to the closed position therefor, shown in FIG. 3 and thereafter during the tire forming and tire curing periods. As the final shaping operation commences, any air entrapped between the tire band 52 and the bladder 38 is vented to the atmosphere through a series of air bleed passages 63 (FIG. 2).

On completion of the tire curing period, the fluid pressure in the bladder 38 is released and the pneumatic unit 62 is actuated to move the toggle linkage 59 out of its off-center locked position to provide for an upward movement of the push rod 57 and a retraction of the pressure piston 54 within the retaining cylinder 56. On opening of the mold assemblies 16 and 17 the actuating plate 47 is elevated to axially extend the bladder 38 to its position of FIG. 1, permitting removal of the formed tire and the loading of the machine 15 with another tire band 52.

The machine 15 thus far described is of an exemplary type and other type machines can be used in the practice of the present invention. For a more detailed description of the machine 15, shown herein, reference is made to U.S. Pat. No. 3,298,066. In known commercial type tire forming machines, as the final shaping operation commences, any air trapped between the tire band and the tire cavity is expelled to the atmosphere, usually through a plurality of air bleed passages (not shown), circumferentially spaced about the mold members 30 and 36 and extended generally radially and laterally therethrough. Following this expulsion of air, the tire band 52 is permitted to expand within such air bleed passages whereby to form a plurality of rubber pins that, as is well known, project outwardly from the tread and side wall portions of a tire so as to detract from the over-all appearance of the tire. More objectionable, however, is the fact that some of these air bleed passages frequently become clogged by the expanding tire band before all of the air has been expelled from the tire cavity. This entrapped air tends to form air pockets between the tire band and the side wall of the cavity which cause irregularities or wrinkles in the tire surface. This tire defacement appreciably reduces both the quality and the saleability of the tire.

It is a principal object of this invention to eliminate the formation of the usual projecting rubber pins in the forming of a tire and the occurrence of wrinkles in the tire surface. To accomplish this purpose, air is initially evacuated from the tire cavity through valve controlled air passages during a first stage shaping operation. Following such evacuation, the air passages are closed in the surface of the side wall of the cavity so that the terminal ends of the air passages are flush with and form a continuous surface with the cavity side wall. The second stage or final shaping operation of the tire then takes place under a subatmospheric pressure in the tire cavity.

Figure 4:
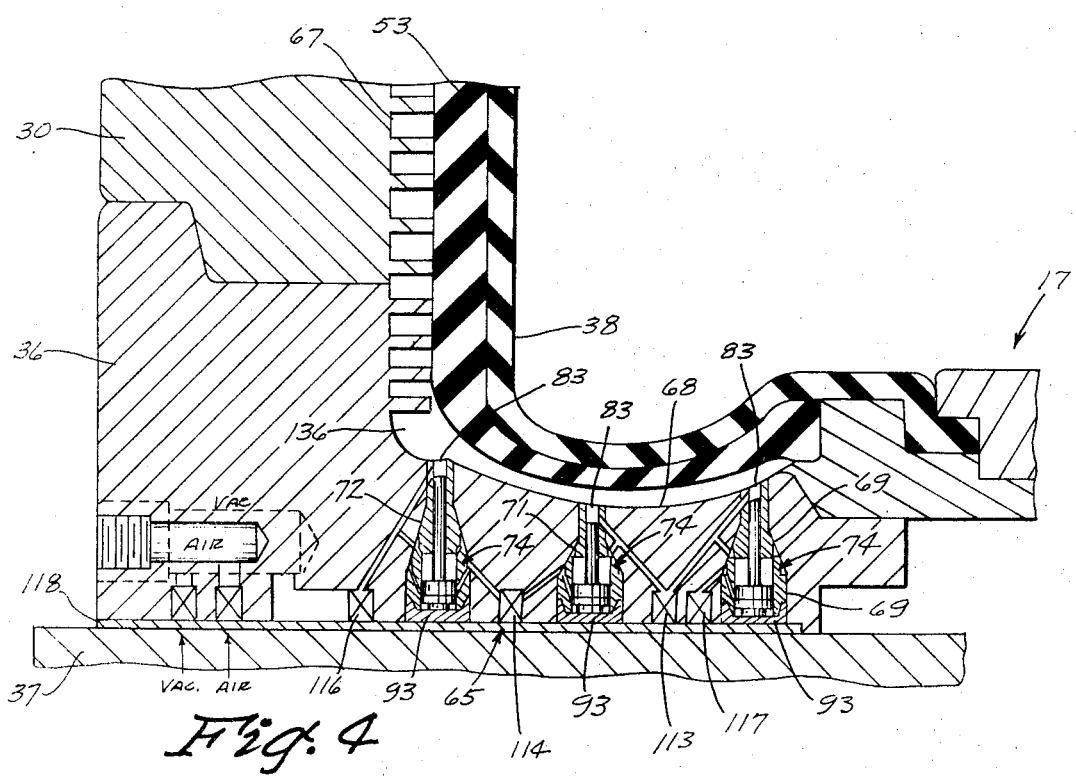
FIG. 4 is an enlarged detailed showing of the air bleed passages and the valve controls therefor that are illustrated generally in FIG. 3, and which form part of the means providing evacuation of air from the tire cavity prior to the final tire forming operation.

Thus, as shown in FIGS. 3 and 4, the upper and lower mold members 30 and 36, respectively, are formed with like air passage systems, indicated generally as 60 and 65 also respectively. Since these air passage systems are similar in construction and operation, only the system 65 of the lower mold member 36 will be described in detail with like numerals of reference being applied to like parts.

When the mold members 30 and 36 (FIG. 3) are in their closed positions, a tire cavity 66, formed between their inner adjacent sides, includes a tread wall section 67 and side wall sections 68. The side wall sections 68 of the lower mold member 36 is formed with a series of three rows of passages 69, 71 and 72, arranged in circles concentrically spaced about the axial center of the mold member 36 and extended laterally therethrough so as to be open to the surface 73 of the mold member located adjacent to the lower heating platen 37. The passages in each circular row are of a different length than the passages of the remaining two rows due to the relative arrangement of the rows on the curved side wall section 68 of the tire cavity 66.

Each passage 69, 71 and 72 (FIG. 4) is of the same general shape in longitudinal section and provided with similar corresponding control valve units 74, all of which are concurrently operated in a similar manner in response to a common actuating means. Only a valve unit 74 for a passage 69, therefore, will be described in detail, with like reference numerals being applied to like parts.

A passage 69 (FIG. 9) has an inner section 76 of a small diameter open to the cavity side wall section 68, an outer large diameter section 77 at the mold member surface 73, and an intermediate tapered section 78 extended between and interconnecting the inner and outer passage sections. The junction of the inner section 76 with the tapered section 78 is defined by an annular shoulder 79. A valve unit 74 (FIGS. 9 and 10) has a body member 81 integrally formed with a stem or cylindrical axial extension 82 so as to have a shape corresponding to the longitudinal sectional shape of the passage 69 for positioning within such passage. The stem section 82 is located within the inner passage section 76 and the body member 81 within the tapered section 78 and large outer section 77 of a passage 69. An axially extended bore 83 in the body member 81 has a portion 84 of enlarged diameter.

The outer surface of the body member 81 (FIGS. 9 and 10) is of a circular stepped configuration so as to have an upper step 86 that defines the lower end of the axial axial stem 82, an intermediate step 87 and a lower step 88. The corner edge of the intermediate step 87 is sloped to the taper of the tapered passage section 78, and the corner edge of the lower step 88 is shaped in correspondence with both the tapered passage section 78 and the straight wall of the outer passage section 77. The upper step 86 has a diameter slightly less than the diameter of the shoulder 79 so that the body member 81 of valve unit 74 is insertable within a passage 69 to a fitted or assembled position determined by a contact sealing engagement of the corner edges of the steps 87 and 88 with the side wall of the passage intermediate tapered section 78.

In this fitted or assembled position of the valve body member 81 the top surface or face 92 of the axial stem 82 is contoured so as to be flush with the surface of the cavity side wall section 68 (FIG. 9). The valve body member 81 is held within a passage 69 by a retaining plug 93, receivable in the passage outer section 77 and provided with an upstanding annular wall 94 that extends peripherally about and has a tapered fit with the lower portion of the body member 81. The plug 93 is locked within the passage 69 by screws 96 threadable within corresponding tapped holes 97 in the lower surface 73 of the mold member 36 and having flat heads 98 countersunk within the surface 73 with a head portion extendible within a peripheral recess 101 provided in the plug 93.

A valve member 102 for a value unit 74 has a valve stem 103 reciprocally movable within the bore 83 of the axial stem 82 of the valve body member 81 (FIGS. 9 and 10). Integral with the valve stem 103 is a valve head 104 that functions as a piston for reciprocal movement within the enlarged portion 84 of the bore 83. With such bore portion 84 closed by the plug 93 it is seen that the side wall of the bore section 84 and the side wall of the bore section 84 and the plug 93 define a closed cylinder chamber 105 for the piston or valve head 104. The valve head has a reduced section 110 opposite the plug 93 which carries a sealing ring 106 for contact engagement with the side wall of the enlarged bore portion 84 for a purpose to appear later.

It is to be noted that the face 107 at the outer end of the valve stem 103, similar to the face 92 of the body member axial stem 82 is contoured to the shape of the surface of the cavity sidewall section 68. Thus, with the valve head 104 in abutting engagement with the annular shoulder 108 (FIG. 9) which defines the inner end of the enlarged bore portion in the body member 81, the face surfaces 92 and 107 are flush and continuous with a side wall section 68 of the tire cavity 66. To maintain this surface continuity, a radially extended guide pin 109 (FIGS. 9 and 10) in the body member 81 is guidably received within an axial groove 111 formed in the valve stem 103. The valve member 102 is thus held against rotational movement relative to the valve body member 81 so that the face 107 thereof is always flush with the cavity side wall section 68 when the valve stem 103 is moved to its outermost position within the axial stem 82 of the valve body member 81.

Figure 5:
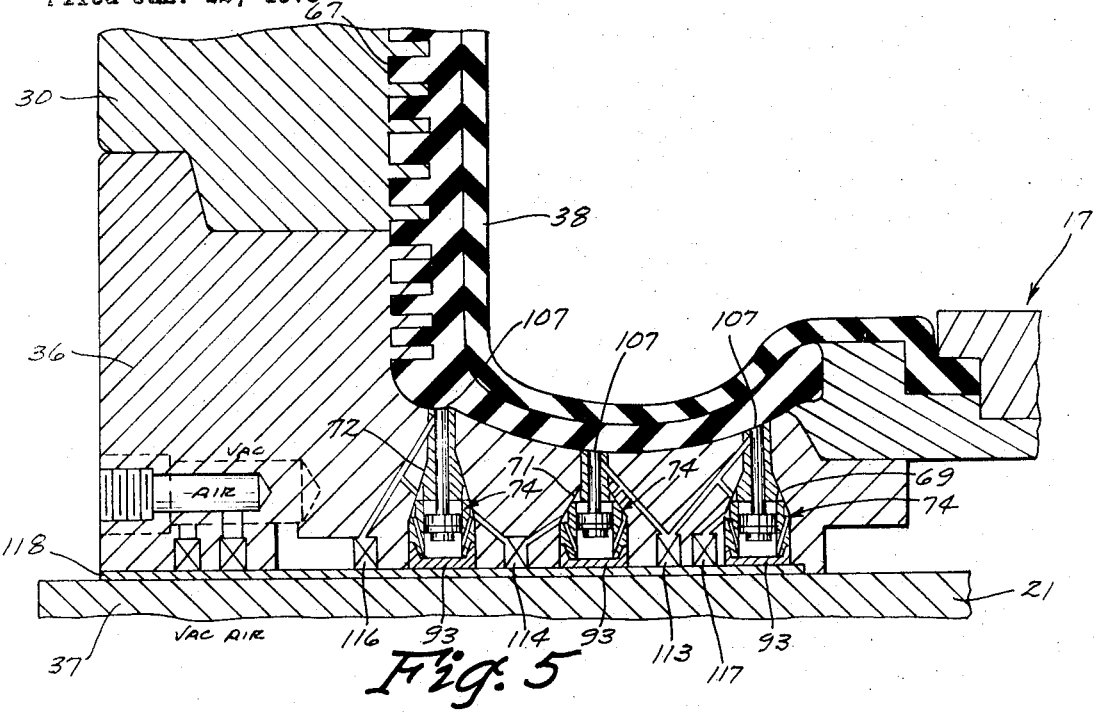
FIG. 5 is illustrated similarly to FIG. 4 and shows the tire in a final forming position with the valve controls in changed positions.
Figure 7:
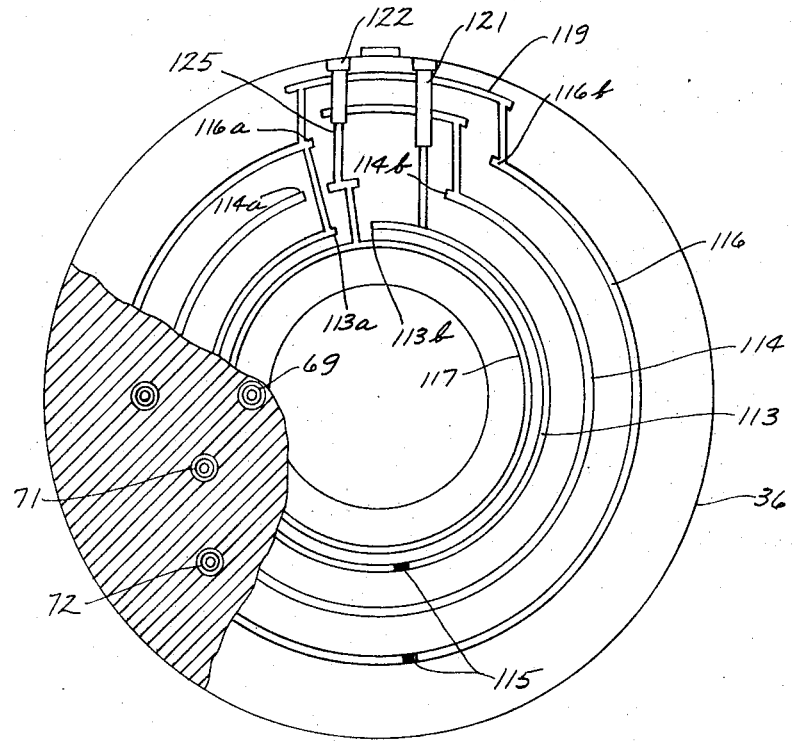
FIG. 7 is a diagrammatic bottom plan view of the lower mold section showing the concentric arrangement of air and vacuum lines therein, with a portion of the mold section broken away to illustrate the relative position to such lines of the valve controls that are located in the upper side of the lower mold section.

Referring to FIGS. 5 and 7, it is seen that the lower side 73 of the mold member 36 is formed with a series of grooves 113, 114 and 116 of circular segmental shape arranged in a concentrically spaced relation and having spaced ends 113a and 113b, 114a and 114b, and 116a and 116b, respectively. A circular groove 117 is arranged inwardly of the inner segmental groove 113. All of the grooves 113, 114, 116 and 117, along with other grooves formed in the mold surface 73, which will be described later, are closed by a common cover plate 118 to form a part of the air passage system 65 within the mold member 36. For the purpose of descriptive clarity the grooves 113, 114, 116, and 117 will hereinafter be referred to as passages.

The circular row of air passages 69 (FIG. 7) is arranged inwardly of the circular passage 117; the circular row of air passages 71 is between the segmental passages 113 and 114; and the circular row of passages 72 is between the segmental passages 114 and 116. The ends 116a and 116b of the passage 116 are connected to a common closed passage 119 having fluid registration with a vacuum connection 121 so that the passage 116 will hereinafter be referred to as a vacuum passage. The end 113b of the passage 113 is fluid connected directly to the vacuum connection 121 while its other end 113a is connected to the passage end 116a. The segmental passage 113 therefor will also hereinafter be referred to as a vacuum passage. It will be noted that the passages 113 and 116 are closed intermediate the ends thereof, as indicated at 115, to provide for a uniform application of a vacuum pressure over the full lengths thereof. The end 114b of the passage 114 is fluid connected to an air connection 112 through a passage 112 and the circular passage 117 is connected to the air connection 122 by a passage 125. The passages 114 and 117, therefore, will hereinafter be referred to as air passages.

Figure 8:
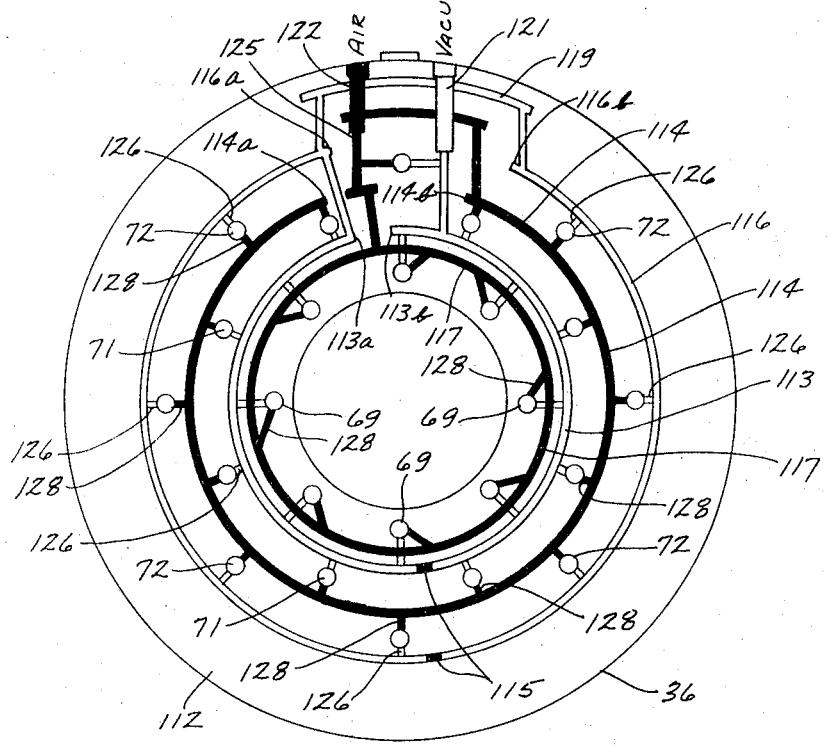
FIG. 8 is a diagrammatic showing of the lower mold section illustrating the air and vacuum lines and the air passages which interconnect such lines to the air control valves.

As shown in FIGS. 9 and 10, the top side of the intermediate step 87 of the valve member 81 is formed with a series of circumferentially spaced holes 123 which open into the top side of the cylindrical chamber 105. The upper side of the lower step 88 is formed with a series of circumferentially spaced holes 124 that open to the lower side of the cylindrical chamber 105. The circular passage 125, formed above the intermediate step 87 (FIGS. 5 and 9), is fluid connected with a vacuum passage 126. For the cavity connected passages 69 and 71, the passages 126 interconnect the vacuum passage 133 with that portion of the axial bore 83 located above a retracted position of the valve stem 103. For this purpose the axial stem 82 is formed with an opening 110 in registration with one end of a passage 126. A passage 126 provides a similar connection of the vacuum passage 116 relative to the bore 83 of a cavity passage 72. The circular passages 127 formed above the lower steps 88 of the body members 81 in the cavity air passages 69 are fluid connected by air passages 128 with the air passages 117, and in the cavity air passages 71 and 72 the circular passages 127 are connected by the passages 128 with the air passage 114. For the purpose of clarity the air passages 114 and 117, their interconnecting passages 112 and 115 with the air connection 122, and their interconnecting passages 128 with the lower end of the cylindrical chambers 105 of the valve units 74 are shown shaded in FIG. 8 in contrast to the unshaded showing of the vacuum passages 113 and 116 and their corresponding interconnecting passages with the vacuum connection 121 and upper end of the cylindrical chamber 105.

Figure 6:
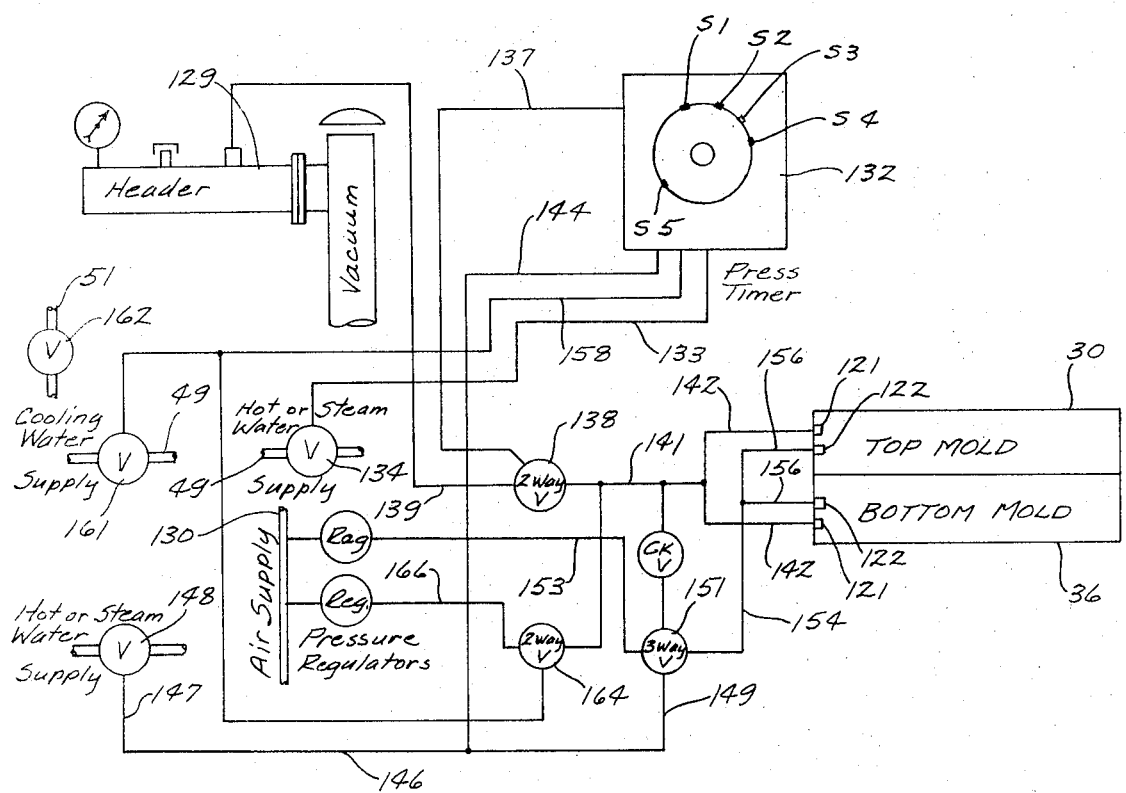
FIG. 6 is a schematic showing of the air control system for operating the tire forming machine.

The air control system for the machine or tire press 15 (FIG. 6) shows the vacuum connections 121 as being connected to a vacuum pump or air ejector 129 and their air connections 122 to a pressure air supply 130. This control system is automatic and air operated in a well-known manner in response to predetermined station or stage settings on a press timer, indicated at 132. At station S1, the loading device 53 is actuated to position a tire band 52 about the bladder 38 (FIG. 1) after which the upper mold member 30 is moved toward a closed position with the lower mold member 36 (FIG. 2).

As the upper mold member closes the press timer reaches station S2 (FIG. 6) whereupon instrument air, namely, the actuating air pressure for the control system, is applied through an instrument air line 133 to open a normally closed valve 134 to admit shaping steam at a pressure of about one hundred eighty pounds per square inch into the bladder 38 through the fluid pressure line 49. This steam pressure expands the bladder 38 (FIG. 3) to move the tire band 52 into a position adjacent to but spaced from the surfaces 67 and 68 of the tire cavity side wall so as to form with such side wall an expanding chamber 136. Also at station S2, instrument air is admitted to a line 137 for opening a normally closed valve 138 to connect the vacuum connections 121 in the mold members 30 and 36 with the air ejector 129 through vacuum lines 139 and 141 and associated feeder lines 142. This provides for the withdrawal of air from the expansion chamber 136 to produce a sub-atmospheric pressure in such chamber of about twenty eight inches of mercury.

At station S2 the valve units 74 are in normally open positions as shown in FIG. 4. Thus, in response to the evacuation of air from the vacuum passages 113 and 116

(FIGS. 4 and 8) the air in the expansion chamber 136 is drawn through the axial stem 82 of the valve body member 81 and through the passages 126 which interconnect the vacuum passages 113 and 116 with the bores 83 in the axial stems 82 at positions above the retracted position of the end faces 107 of the valve stems 102. It is seen, therefore, that those portions of the bores 83, located above the retracted end faces 107 constitute terminal ends of the interconnecting passages 126. These terminal ends are opened and closed by the reciprocal movement therein of the valve stems 102 so as to control the fluid registration of the tire cavity 66 with the interconnecting passages 126. It is to be further noted that a vacuum or subatmospheric pressure is also produced in that portion of the cylindrical chamber 105 located above the valve head or piston 104 for a purpose to appear later. The air evacuation system should be of a capacity such that a time period of about ten seconds adequately provides for the evacuation of air from the expansion chamber 136 to the sub-atmospheric pressure of about twenty eight inches of mercury.

On reaching station S3 the press timer 132 operates to hold open the instrument air line 137; to close the instrument air line 133, and to open the instrument air line 144, which is connected to an instrument air line 146 that has a first feeder line 147 connected to a normally closed valve 148 and a second feeder line 149 connected to a normally open valve 151. Opening of the valve 148 admits hot water at a temperature of about 370° F. and a pressure of about three hundred pounds per square inch into the bladder 38 through the fluid pressure line 49 (FIG. 3). This bladder pressure expands the tire band 52 within the air evacuated expansion chamber 136 and into conforming engagement with the side wall sections 67 and 68 of the tire cavity. It is seen, therefore, that the final shaping of the tire band 52 takes place in a substantial vacuum so that the formation of any air pockets between the tire band 52 and the tire cavity surface tending to produce wrinkles in the side walls of the completed tire are thus substantially eliminated.

Opening of the valve 151 by the instrument air in the feeder line 149 supplies pressure air from the air source 130 to the mold member air connection 122 through air line 153, valve 151, air line 154 and feeder lines 156. Pressure air is thus supplied to the air passages 114 and 117 for admission through the interconnecting passages 124 and 128 into the lower end of the cylindrical chamber 105 and about the reduced section 110 of the valve head 104. The application of this pressure air to the underside of the valve head 104 moves the valve stem 103 upwardly within the axial stem 82 until its end face 107 is flush and continuous with the end face 92 of the axial stem. The terminal ends of the vacuum connecting passages 126 are thus completely closed by the valve stems 103, the faces 107 of which are continuous with the surface of the tire cavity. This surface continuity is defined by the engagement of the upper surface of the valve head 104 with the shoulder 79. Expansion of the tire band 52 within the bores 83 of the valve body members 81 is thus positively prevented so as to eliminate the forming of any projected rubber pins on the completed tire.

As previously mentioned, the instrument air line 137 remains open at station S3 so that the air ejector 129 continues to exhaust air from the vacuum passages 113 and 116, the interconnecting passages 126 and their associated branch passages 123. These branch passages 123 function as air bleed passages relative to the upper portion of the cylindrical chamber 105 so as to facilitate the closing movement of the valve member 102 by the application of pressure air thereunder. The continued withdrawal of air from the interconnecting passages 126 and branch passages 123 additionally provides for the escape of any pressure air seepage that might occur in a valve unit 74 about the valve head 104 or the valve stem 103.

The tire band 52 remains in the final shaping stage at station S3 under the heat and pressure applied by the bladder 38 for a complete tire curing period, which is terminated when the pressure timer 32 reaches station S4. At station S4 instrument air line 158 is opened and instrument air lines 137 and 144 are closed so as to cut off any further air evacuation by the ejector 129, the supply of hot water under pressure to the bladder 38 and the supply of pressure air to the mold member air connections 122 through the valve 151 and air line 154. Instrument air in the line 158 (FIG. 6) actuates a normally closed valve 161 to supply cool water to the fluid pressure line 49, and a normally closed valve 162 to blow down or drain the bladder 38. This blowing down operation takes place concurrently with a movement of the upper mold member 30 to the open position therefor.

The instrument air line 158 has a branch line 163 to actuate a normally closed valve 164 which on being opened provides for the supply of pressure air from the pressure air source 130 through air line 166 and into the vacuum line 141 for travel into the vacuum passages 113 and 116. This use of the vacuum passages 113 and 116 admits pressure air into the interconnecting passages 123 and 126 to provide for the application of pressure air on the upper surface of the valve heads 104 of the valve units 74. The valve heads 104 are thus moved downwardly within the cylindrical chamber 105 to, in turn, provide for the movement of their corresponding valve stems 103 to retracted positions providing for a fluid registration of the tire cavity 66 with the interconnecting passages 126. The valve units 74 are thus in a normally open position to provide for the evacuation of air from the tire cavity at station S2.

On completion of the blow down operation corresponding to a movement of the timer press to station S5, all of the instrument air lines 133, 137, 144 and 158 are closed and the complete tire is manually removed from the press. When the press timer 132 again reaches station S1, the above described cycle of operations is repeated.

It is seen, therefore, that the air passage systems 60 and 65 in the mold members 30 and 36, respectively, and their coacting relation with the valve units 74 provides for an initial expansion of the tire band 52 within the tire cavity 66 to a position adjacent to but spaced from the cavity wall surface. At such time the air within such space is completely evacuated and the air openings in the cavity side wall are plugged by the valve units 74 to form therewith a flush continuous surface prior to the final expansion of the tire band into conforming engagement with the cavity side wall.

Although the invention has been described with respect to a preferred method and apparatus, it is not to be so limited since changes and modifications can be made therein which are within the full intended scope of this invention as defined by the appended claims.

I claim:
1. The method for forming a tire wherein shaping pressure and heat are applied to a preformed tire band centered within a closed tire cavity and having an outer surface expandable against the inner surface of the side wall of a tire cavity, comprising the steps of:
  (a) centering the preformed tire band about an expandable bladder within the tire cavity,
  (b) expanding the bladder under an initial pressure to move the outer surface of the tire band to a position adjacent to but spaced from the inner surface of the tire cavity side wall,
  (c) exhausting air from the space about said tire band through air passages in the tire cavity side wall having terminal ends open to the inner surface of said side wall to provide a subatmospheric pressure in said space,
  (d) closing said terminal ends to maintain the subatmospheric pressure in said space concurrently with forming a smooth surface continuous with the inner surface of the cavity side wall;

(e) expanding the bladder into said space under a final pressure to move the outer surface of the tire band into conforming engagement with the inner surface of said cavity side wall, (f) curing the tire band under said final pressure for a predetermined time period, and then (g) releasing said final pressure and removing the formed tire from the tire cavity.

2. The method for forming a tire in accordance with claim 1 wherein:

(a) air is exhausted from the space about said tire band for a time period of about ten seconds to provide a sub-atmospheric pressure of about twenty eight inches of mercury.

3. The method for forming a tire in accordance with claim 1, including:

(a) opening said terminal ends concurrently with the releasing of said final pressure.

References Cited

UNITED STATES PATENTS

| | | |
|---|---|---|
| 3,579,626 | 5/1971 | G. B. Brittain ____ 264—315 XR |
| 2,779,386 | 1/1957 | H. H. Waters _____ 264—102 XR |
| 1,276,411 | 8/1918 | R. B. Price _____ 264—102 XR |
| 1,482,145 | 1/1924 | J. E. Perrault ____ 425—812 XR |
| 3,489,833 | 1/1970 | J. P. Lehnen _____ 264—315 |

FOREIGN PATENTS

| | | |
|---|---|---|
| 922,788 | 4/1963 | Great Britain _____ 425—812 |

JAN H. SILBAUGH, Primary Examiner

U.S. Cl. X.R.

264—315; 425—43, 812